June 26, 1945. C. C. KREBS 2,379,239
PORTABLE ROTISSERIE
Filed Aug. 7, 1943  2 Sheets-Sheet 1

Inventor
Carl C. Krebs,
By
Attorney

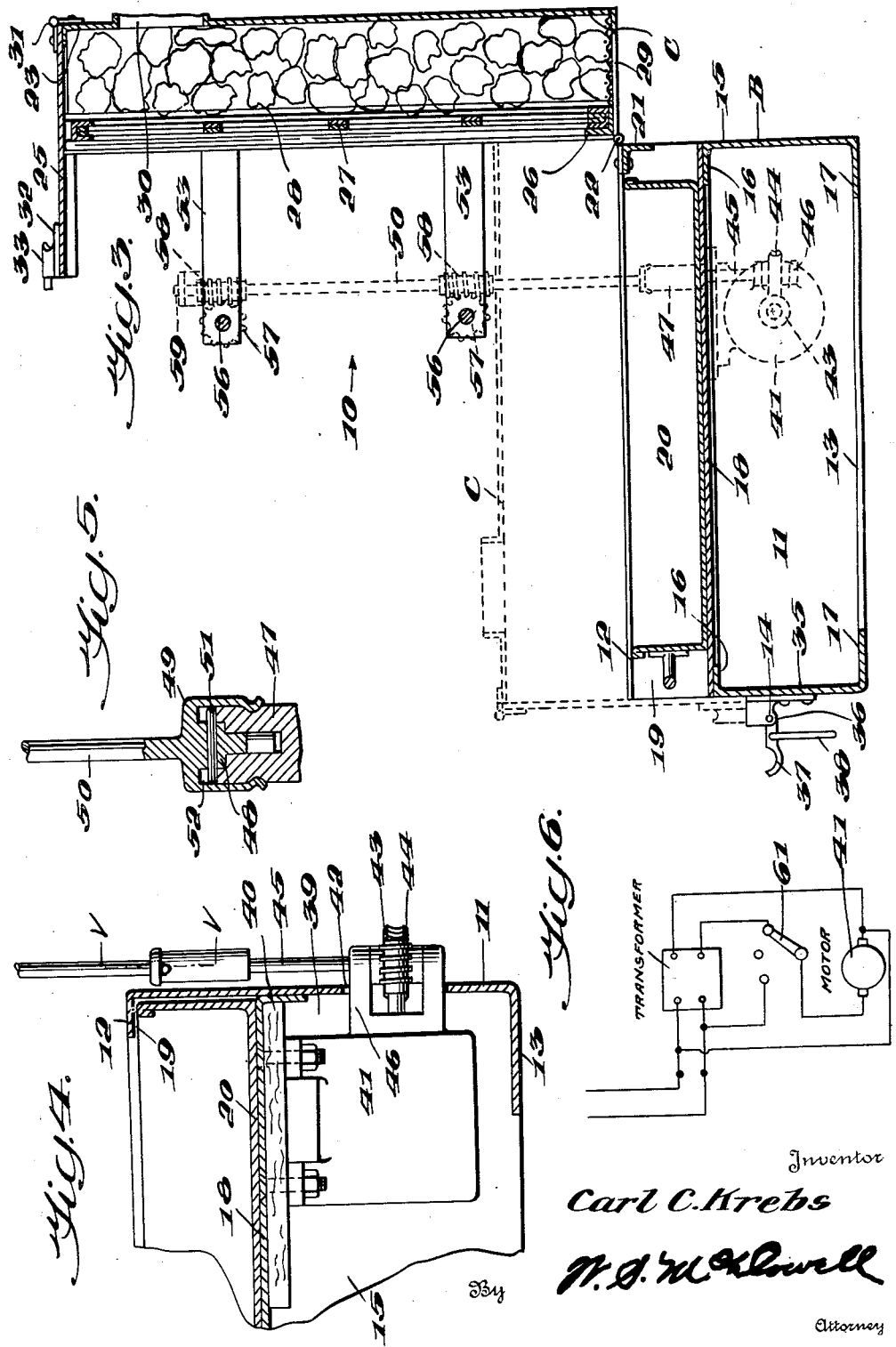

Patented June 26, 1945

2,379,239

UNITED STATES PATENT OFFICE 2,379,239

PORTABLE ROTISSERIE

Carl C. Krebs, Columbus, Ohio

Application August 7, 1943, Serial No. 497,768

3 Claims. (Cl. 126—25)

This invention relates to improvements in rotisserie equipment, having particular reference to an improved portable stove unit in which comestibles, impaled on a rotary spit, are revolved before an open fire.

It is an object of the invention to provide a broiler or stove unit which may be readily moved from place to place and adapted for use in both indoor and outdoor locations.

It is another object of the invention to provide an improved rotisserie wherein the same is constructed to include a casing comprising a base section and a hingedly movable upper section, the said sections being so constructed and arranged that when the rotisserie is in active operation, the upper section occupies a vertical plane perpendicular to the general plane of the base section, and when the rotisserie is not in use, the upper section may be folded down upon the base section, after the manner of a travelling case, so that the casing will assume a compact form to require but a minimum of storage space.

A still further object of the invention is to provide the upper section of the casing with a fuel-receiving chamber, adapted for the reception of charcoal or other fuel, the front of the chamber being provided with an open grille in order that heat generated by the burning of the fuel may be transmitted to meats or other comestibles, mounted on a rotary spit which is supported in connection with the upper section of the casing.

An additional object of the invention is to provide a rotisserie casing in which the base section is provided with an electric motor and the hinged upper section with a rotary spit, demountable means being provided for transmitting power from the motor contained by the base section to the rotary spit supported by the top section, the demountability of said means enabling the top section to be closed upon the base section when the apparatus is not in use.

Other objects reside in the provision of means for demountably supporting one or more rotary spits in connection with the casing, in the provision of electrically operated means for applying rotary power to the spits, said means being of such nature as to permit the same to be operated by current furnished from standard commercial house lighting circuits or from the storage battery of a motor vehicle when standard house current is not available, and in the provision of a compact and improved rotisserie which may be used by campers, for picnic purposes, or in the home, the construction of the rotisserie being sturdy, simple to operate and use and unlikely to become out of order or occasion undue repairs.

For a further understanding of the invention, reference is to be had to the following description and the accompanying drawings, wherein:

Fig. 3 is a vertical transverse sectional view taken through the structure on the plane indicated by the line III—III of Fig. 2;

Fig. 4 is a vertical transverse sectional view taken on the plane indicated by the line IV—IV of Fig. 2;

Fig. 5 is a similar view of the coupling employed in detachably uniting a motor driven shaft with the drive shaft for the rotary spits;

Fig. 6 is a diagrammatic view disclosing the motor operating circuit.

Figure 1:
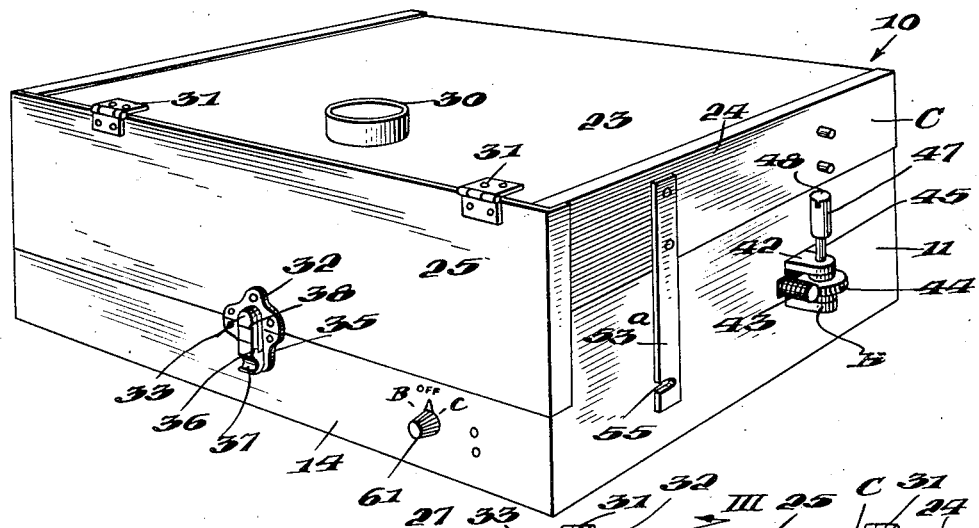
Fig. 1 is a perspective view of my improved rotisserie, showing its casing in a closed position.

Referring more particularly to the drawings, the numeral 10 designates my improved rotisserie in its entirety. The same in its preferred form comprises a casing embodying a base section B and a cover or top section C. In the main, these sections are composed of united, flanged, reenforced, sheet metal walls. In this regard, the base section is formed to include vertical, parallel side walls 11, which have their upper edges inwardly flanged as at 12 and their lower edges similarly flanged as at 13. The side walls are united by longitudinally extending, parallel front and back walls 14 and 15, respectfully. These walls have their upper edges inwardly flanged as at 16 and their lower edges inwardly flanged as at 17. To the upper flanges 12 and 16, there is secured a horizontally disposed top wall 18. This wall is located below the plane of the upper flanges 12 of the side walls 11 so that there is formed a longitudinal guideway 19 adapted for the sliding reception and support of a basting tray or drawer 20.

The rear upper edges of the side walls 11 are united by a longitudinally extending, horizontally disposed angular member 21. This member carries hinges 22, the latter being also attached to the cover section C, so that when the stove is not in use, the cover section may be lowered on the base section and united therewith to produce a compact and readily handled unit.

Figure 2:
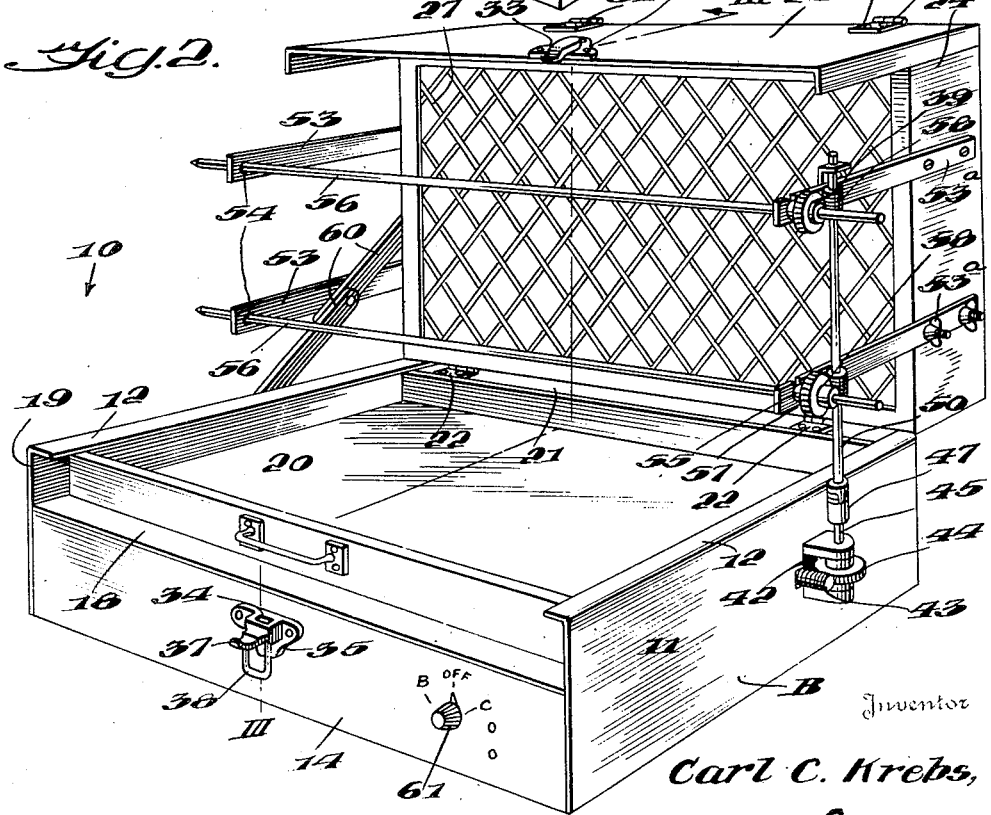
Fig. 2 is a similar view disclosing the casing in its open or active position.

The cover section C, assuming the same to be in its elevated or active position, as disclosed in Figs. 2 and 3, comprises a back wall 23 joined marginally with perpendicularly disposed parallel side walls 24 and a horizontally disposed top wall 25. The side walls 24 at their forward vertical edges are formed with guides 26 in which is received a foraminated panel or grille 27, the latter being spaced from the back wall 23 in order to form a fuel-receiving chamber 28. The bottom of this chamber is provided with a screen 29 so that air may readily pass upwardly through the chamber to promote the combustion of charcoal, or other solid fuel, placed therein. Toward its upper region, the back wall 23 is formed with a smoke outlet 30. The top wall 25 is hinged as at 31 to the upper edge of the back wall 23 and projects beyond the plane of the panel or grille 27. When the cover section is in its lowered position, the wall 25 thereof is arranged at the front of and overlaps the front wall 14 of the base section. The outer edge of the top wall 25 is equipped with a plate 32 having a grooved head 33. This head is arranged to enter a socket 34 provided on a plate 35 carried by the front wall 14. Pivoted as at 36 to the plate 35 is a lever 37 which carries a link 38. The upper part of the link 38 is adapted to be received within the groove of the head 33 and, when the lever 38 is forced inwardly, the link is seated in the groove of said head and held against movement to fasten the base and cover sections of the casing together, after the manner of a trunk latch.

Beneath the top wall 18 of the base section, there is formed a motor compartment 39. The under side of the top wall 18 carries an asbestos or other heat insulating panel 40 and fastened to this panel and to the top wall 18 is the base of an electric motor 41. This motor is of a compound D. C. and A. C. wound type, and is capable of being operated by the standard 6 volt current supplied by a motor vehicle storage battery. This is desirable in order that my improved rotisserie may be used in outdoor locations, as on picnic or camping trips, where standard commercial power circuits are not available. However, through the use of a suitable transformer, standard 110 volt A. C. circuits may be converted so that they may be used for operating the motor 41 when such standard current is available.

The shaft of the motor 41 projects through an opening 42 provided in one of the side pawls 11, and carries a worm 43 which meshes with a worm gear 44 fastened to a short vertical shaft 45. This shaft is journaled in bearings 46 which project from the frame housing of the motor 41. The upper end of the shaft 45 carries a coupling member 47 which has its upper end socketed as at 48 to receive a collar 49, the latter being fixed on the lower end of the vertical drive shaft 50 of the spit operating mechanism. The collar 49 is formed with one or more pins 51 which are received within a notch 52 provided in the wall of the socket 48. This coupling permits the shaft 50 to be disconnected from the shaft 45 when the the cover section C is to be lowered.

Projecting forwardly and rigidly from the side walls 24 of the cover section are upper and lower sets of arms 53 and 53a. The arms 53 have their outer ends provided with spit-receiving openings 54, while the arms 53a have their outer ends formed with spit-receiving notches 55. By this construction, spit rods 56 are journaled for rotation in connection with the outer ends of said arms. Each of the rods 56 is provided at one end with a worm gear 57, which meshes with worms 58 fastened to the shaft 50, the upper end of the latter shaft being journaled as at 59 in connection with a bracket extension formed on the upper of the arms 53a. Hinged brace links 75 60 are pivotally connected with each other and with the base and cover sections and serve to limit the swinging movement of the cover section in an upward direction away from the base section and to maintain the cover section positively in its elevated or vertical position.

In view of the foregoing, it will be seen that the present invention provides a simple, efficient and compact rotisserie which may be used advantageously and conveniently in the roasting or broiling of meats, poultry and other food products. In the use of the device, the spit rods are removed from their bearing supports in order that comestibles may be impaled thereon. The rods are then restored to their supported positions of rotation in connection with the arms 53 and 53a, with the gears 57 meshing with the worms 58. The motor 41 is then enregized and power is imparted to the drive shaft 50, causing the rotation of the spit rods and the comestibles contained thereon. The rotation is preferably slowly performed so that the food products may be subjected thoroughly to the action of radiant heat evolved by the burning of fuel contained in the chamber 28. Fat drippings released from the roasting comestibles are caught in the tray or drawer 20 and may be used for basting purposes.

Following use and when it is desired to close the casing, the spit rods 56 are removed from the arms 53 and 53a, and the drive shaft 50 is disconnected from the coupling 47. Upon the discharge of burned fuel from the chamber 28, which may be easily effected as a result of the employment of the hinged top wall 25, the cover section, following the breaking of the joint between the link braces 60, may be rocked toward its lowered position. The arms 53 and 53a, when the cover section is fully lowered, are arranged at the sides of the base section. Preferably, one of these arms is removed, as shown in Fig. 1, so that it will not interfere with the bearings 46 for the vertical shaft 45. The cover section may then be latched to the base section, as illustrated in Fig. 1, and the casing thus maintained in its closed or collapsed position. In such a position, the casing will occupy but a minimum of storage space, so that the same may be readily placed in the luggage compartment of a motor vehicle. The front wall 14 of the base section may be provided with a manually operated control switch 61 for the motor 41 and to permit the motor to be adapted to sources of current supply obtained either from the use of batteries or standard house circuits.

While I prefer to form the casing so that the same may comprise two hingedly united sections, it is also within the scope of the invention to rigidly unite the base and upright sections of the casing, without employing the hinge union. Also, other variations or modifications may be applied without departing from the scope of the invention, as the same has been defined in the following claims.

I claim:

1. A portable culinary stove comprising a casing having a base section and a cover section hinged thereto for swinging movement in a vertical plane, pivoted links uniting the base and cover sections for maintaining the cover section in a substantially vertical position when in active operation, said cover section being formed with a fuel-receiving chamber having an open front, a motor positioned within the confines of said base section, a member driven by said motor and projecting beyond one of the side walls of said base section, rigid arms projecting outwardly and horizontally from the cover section, a spit rod removably journaled in openings provided in the outer ends of said arms, gearing for rotating said rod supported in connection with said arms, and separable coupling means between said driven member and spit rod gearing, said coupling means when separated permitting swinging movement of said cover section from its vertical active position to a horizontal inactive position overlying said base section.

2. A portable culinary stove comprising a casing having hingedly united base and top sections, brace means pivotally united with said sections for positively maintaining said top section in an active substantially vertical position with respect to the horizontally disposed base section, a fuel receptacle having an open front formed in said top section, a rotatable spit supported by said top section in spaced relation from the open front of said fuel receptacle, an electric motor disposed in said base section, an externally positioned drive shaft driven by said motor and carried by said base section at one end thereof, a spit rotating shaft carried by said top section in vertical alignment with said drive shaft, and separable coupling means uniting said drive and spit shafts, the separation of said coupling means serving to admit of swinging movement of said top section relative to the base section.

3. A portable culinary stove comprising a casing composed of hingedly united base and top sections, fastening means for uniting said sections against relative separation when the top section is folded down upon and in registering relationship with the base section, said top section being formed with an open front fuel-receiving chamber, upper and lower sets of arms projecting from the sides of said top section, spit rods rotatably mounted in openings provided in the outer ends of said arms, a motor mounted in said base section, a vertical shaft driven by said motor rotatably supported on one end of said base section, a spit rotating shaft rotatably supported by said arms and adapted to be aligned vertically with said base carried shaft when said top section is elevated, gearing cooperative with said spit shaft for rotating said rods, and a detachable coupling uniting said shafts when the top section is in its upright position, the separation of the coupling admitting of swinging movement of said top section.

CARL C. KREBS.